(12) United States Patent
Kang et al.

(10) Patent No.: US 12,021,212 B2
(45) Date of Patent: Jun. 25, 2024

(54) BATTERY MODULE, AND BATTERY PACK AND VEHICLE COMPRISING SAME

(71) Applicant: LG Chem, Ltd., Seoul (KR)

(72) Inventors: Gyung-Soo Kang, Daejeon (KR); Jee-Ho Kim, Daejeon (KR); Myung-Hoon Ko, Daejeon (KR); Ki-Youn Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 795 days.

(21) Appl. No.: 16/973,563

(22) PCT Filed: Mar. 4, 2020

(86) PCT No.: PCT/KR2020/003084
§ 371 (c)(1),
(2) Date: Dec. 9, 2020

(87) PCT Pub. No.: WO2020/180116
PCT Pub. Date: Sep. 10, 2020

(65) Prior Publication Data
US 2021/0249713 A1    Aug. 12, 2021

(30) Foreign Application Priority Data

Mar. 4, 2019  (KR) ........................ 10-2019-0024839

(51) Int. Cl.
*H01M 10/6572*    (2014.01)
*H01M 10/613*     (2014.01)
(Continued)

(52) U.S. Cl.
CPC ..... *H01M 10/6572* (2015.04); *H01M 10/613* (2015.04); *H01M 10/615* (2015.04);
(Continued)

(58) Field of Classification Search
CPC ............ H01M 10/615; H01M 10/613; H01M 50/204; H01M 10/6572
(Continued)

(56) References Cited

U.S. PATENT DOCUMENTS 7,059,137 B2 *  6/2006  Childress ........... B60H 1/00264
                                            62/3.61
2005/0074666 A1  4/2005  Kimiya et al.
(Continued)

FOREIGN PATENT DOCUMENTS

CN    103403954 A    11/2013
CN    104934655 A     9/2015
(Continued)

OTHER PUBLICATIONS

International Search Report for PCT/KR2020/003084 mailed Jun. 18, 2020; 2 pages.
(Continued)

*Primary Examiner* — James M Erwin
(74) *Attorney, Agent, or Firm* — Lerner David LLP

(57) ABSTRACT

A battery module according to an embodiment of the present disclosure includes a battery cell stack in which a plurality of battery cells are stacked; a casing configured to surround the battery cell stack; and a heat transfer member to cool or heat the battery cells. The heat transfer member is disposed between any two adjacent battery cells of the battery cell stack. The heat transfer member is spaced apart from the battery cells and is configured to move into contact with the battery cells to cool or heat the battery cells.

13 Claims, 6 Drawing Sheets

(51) Int. Cl.
*H01M 10/615* (2014.01)
*H01M 10/625* (2014.01)
*H01M 50/204* (2021.01)
*H01M 50/211* (2021.01)

(52) U.S. Cl.
CPC ....... *H01M 10/625* (2015.04); *H01M 50/204* (2021.01); *H01M 50/211* (2021.01); *H01M 2220/20* (2013.01)

(58) Field of Classification Search
USPC .......................................................... 429/120
See application file for complete search history.

(56) References Cited

U.S. PATENT DOCUMENTS

| | | | | |
|---|---|---|---|---|
| 2006/0060236 | A1* | 3/2006 | Kim | H01M 10/615 |
| | | | | 136/203 |
| 2013/0323543 | A1 | 12/2013 | Grunwald et al. | |
| 2014/0165597 | A1* | 6/2014 | Hernon | H01M 10/6572 |
| | | | | 62/3.2 |
| 2015/0270588 | A1* | 9/2015 | Masias | H01M 10/625 |
| | | | | 429/50 |
| 2017/0170533 | A1 | 6/2017 | Choi et al. | |

FOREIGN PATENT DOCUMENTS

| | | | |
|---|---|---|---|
| CN | 106935926 | A | 7/2017 |
| CN | 109326844 | A | 2/2019 |
| JP | 2004111370 | A | 4/2004 |
| JP | 2009016239 | A | 1/2009 |
| JP | 2012079441 | A | 4/2012 |
| JP | 2013037919 | A | 2/2013 |
| JP | 2014192094 | A | 10/2014 |
| JP | 2015125930 | A | 7/2015 |
| KR | 20120013479 | A | 2/2012 |
| KR | 20120029837 | A | 3/2012 |
| KR | 20140004818 | A | 1/2014 |
| KR | 20140026584 | A | 3/2014 |
| KR | 20160122444 | A | 10/2016 |
| KR | 101734717 | B1 | 5/2017 |
| KR | 101748645 | B1 | 6/2017 |
| KR | 101772061 | B1 | 8/2017 |

OTHER PUBLICATIONS

Extended European Search Report including Written Opinion for Application No. 20765887.3 dated Oct. 13, 2021, pp. 1-9.
Search Report dated Aug. 7, 2023 from Office Action for Application No. 2020800039039 issued Aug. 10, 2023. 3 pgs. (see p. 1-2, categorizing the cited references).

* cited by examiner

BATTERY MODULE, AND BATTERY PACK AND VEHICLE COMPRISING SAME

CROSS REFERENCE TO RELATED APPLICATIONS

The present application is a national phase entry under 35 U.S.C. § 371 of International Application No. PCT/KR2020/003084 filed Mar. 4, 2020, which claims priority to Korean Patent Application No. 10-2019-0024839 filed on Mar. 4, 2019, the disclosures of which are incorporated herein by reference.

TECHNICAL FIELD

The present disclosure relates to a battery module, and a battery pack and a vehicle including the battery module, and more particular, to a battery module, which allows both cooling and heating, and a battery pack and a vehicle including the battery module.

BACKGROUND ART

As technology development and demand for mobile devices have increased, demand for a secondary battery as an energy source has rapidly increased. Conventionally, a nickel-cadmium battery or a hydrogen ion battery has been used as the secondary battery. However, a lithium secondary battery has recently been widely used because charging and discharging is free due to rare memory effect in comparison with a nickel-based secondary battery, the self-discharge rate is very low, and the energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an exterior, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

The behavior of the secondary battery varies depending on the temperature. That is, if the temperature of the secondary battery rises, the secondary battery may swell or explode. Also, if the temperature of the secondary battery falls, the performance of the secondary battery may deteriorate to shorten the life span. Therefore, it is necessary to keep the temperature of the secondary battery within a preset range.

However, the conventional secondary battery cannot cope with a situation in which the temperature is changed, because it is configured to allow only one of cooling and heating. That is, for example, a secondary battery having only a cooling function cannot be used smoothly or its life span is shortened if it is used in cold weather or in a region where the temperature is extremely low. Also, a secondary battery having only a heating function is also difficult to use because swelling or explosion occurs due to the heat generated from the secondary battery.

DISCLOSURE

Technical Problem

The present disclosure is directed to providing a battery module, which allows both cooling and heating, and a battery pack including the battery module.

Technical Solution

In one aspect of the present disclosure, there is provided a battery module, comprising: a battery cell stack in which a plurality of battery cells are stacked; a casing configured to surround the battery cell stack; and a heat transfer member disposed between any one battery cell of the battery cell stack and another battery cell adjacent to the any one battery cell to cool or heat the battery cells, wherein the heat transfer member is installed to be spaced apart from the battery cells and is configured to contact the battery cells to cool or heat the battery cells.

Also, the heat transfer member may include a bimetal in which a plurality of metals having different thermal expansion coefficients are coupled to each other; and a thermoelectric element coupled to at least one of both ends of the bimetal.

In addition, at least one of a heat dissipation plate and a heat dissipation fan may be coupled to the thermoelectric element.

Also, the bimetal may be configured to be bent toward the battery cells by convection of heat generated from the battery cells.

In addition, a first thermoelectric element, which is a Peltier element, may be coupled to one end of the bimetal, and a second thermoelectric element, which is a Peltier element, may be coupled to the other end of the bimetal, which is opposite to one end.

Also, the first thermoelectric element may include a heat emitting portion and a heat absorbing portion, the heat emitting portion of the first thermoelectric element may be coupled to the bimetal, and the heat absorbing portion of the first thermoelectric element may be spaced apart from the battery cells and configured to contact the battery cells when a temperature of the battery cells rises, the second thermoelectric element may include a heat emitting portion and a heat absorbing portion, the heat absorbing portion of the second thermoelectric element may be coupled to the bimetal, and the heat emitting portion of the second thermoelectric element may be spaced apart from the battery cells and configured to contact the battery cells when a temperature of the battery cells falls.

In addition, a third thermoelectric element or a fourth thermoelectric element, which is a Peltier element, may be coupled to only one of both ends of the bimetal.

Also, the third thermoelectric element may include a heat emitting portion and a heat absorbing portion, the heat emitting portion of the third thermoelectric element may be coupled to the bimetal, and the heat absorbing portion of the third thermoelectric element may be spaced apart from the battery cells and configured to contact the battery cells when a temperature of the battery cells rises.

In addition, the fourth thermoelectric element may include a heat emitting portion and a heat absorbing portion, the heat absorbing portion of the fourth thermoelectric element may be coupled to the bimetal, and the heat emitting portion of the fourth thermoelectric element may be spaced apart from the battery cells and configured to contact the battery cells when a temperature of the battery cells falls.

Also, the bimetal to which the third thermoelectric element is coupled may be provided in plural and disposed between the battery cells, respectively, the heat absorbing portion of the third thermoelectric element may contact the battery cells when the temperature of the battery cells rises, and the bimetal may contact the battery cells when the temperature of the battery cells falls, so that the heat generated from the heat emitting portion of the third thermoelectric element is transferred to the battery cells through the bimetal.

Meanwhile, in another aspect the present disclosure, there is also provided a battery pack, comprising: a plurality of battery modules, each including a battery cell stack in which a plurality of battery cells are stacked, and a casing configured to surround the battery cell stack. A heat transfer member is disposed between any one battery module of the plurality of the battery modules and another battery module adjacent to the any one battery module to cool or heat the battery modules, wherein the heat transfer member is installed to be spaced apart from the battery modules and configured to contact the battery modules to cool or heat the battery modules.

Meanwhile, in still another aspect the present disclosure, there is also provided a battery pack, comprising the battery module described above, and a vehicle, comprising the battery module described above.

Advantageous Effects

According to the embodiments of the present disclosure, the heat transfer member spaced from the battery may move toward the battery, thereby allowing both cooling and heating.

In addition, the battery may be easily cooled and heated by the movable heat transfer member.

BEST MODE

Figure 1:
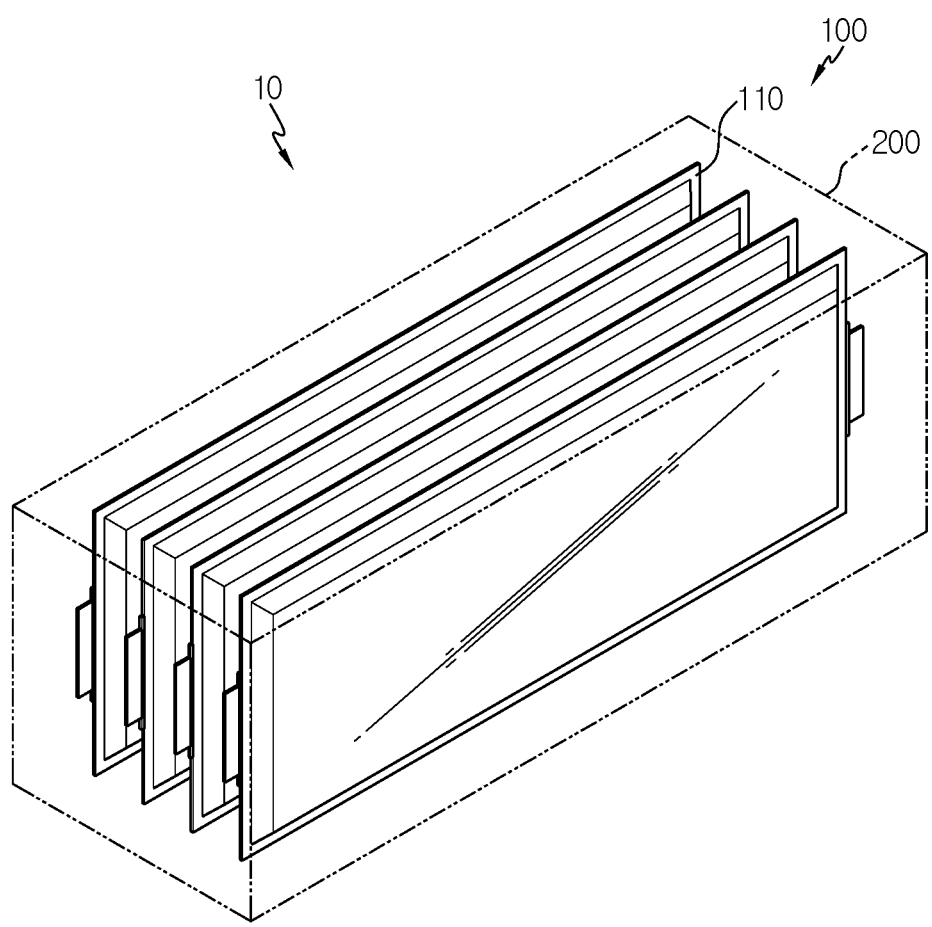
FIG. 1 is a perspective view schematically showing a battery module according to the first embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of description. Thus, the size of each element does not entirely reflect the actual size of the element. A detailed description of well-known functions or elements associated with the present disclosure will be omitted if it unnecessarily obscures the subject matter of the present disclosure.

The term, 'coupling' or 'connecting' as used herein, may refer not only to a case where one member and another member are directly combined or directly connected but also a case where one member is indirectly combined with another member via a connecting member or is indirectly connected.

Figure 2:
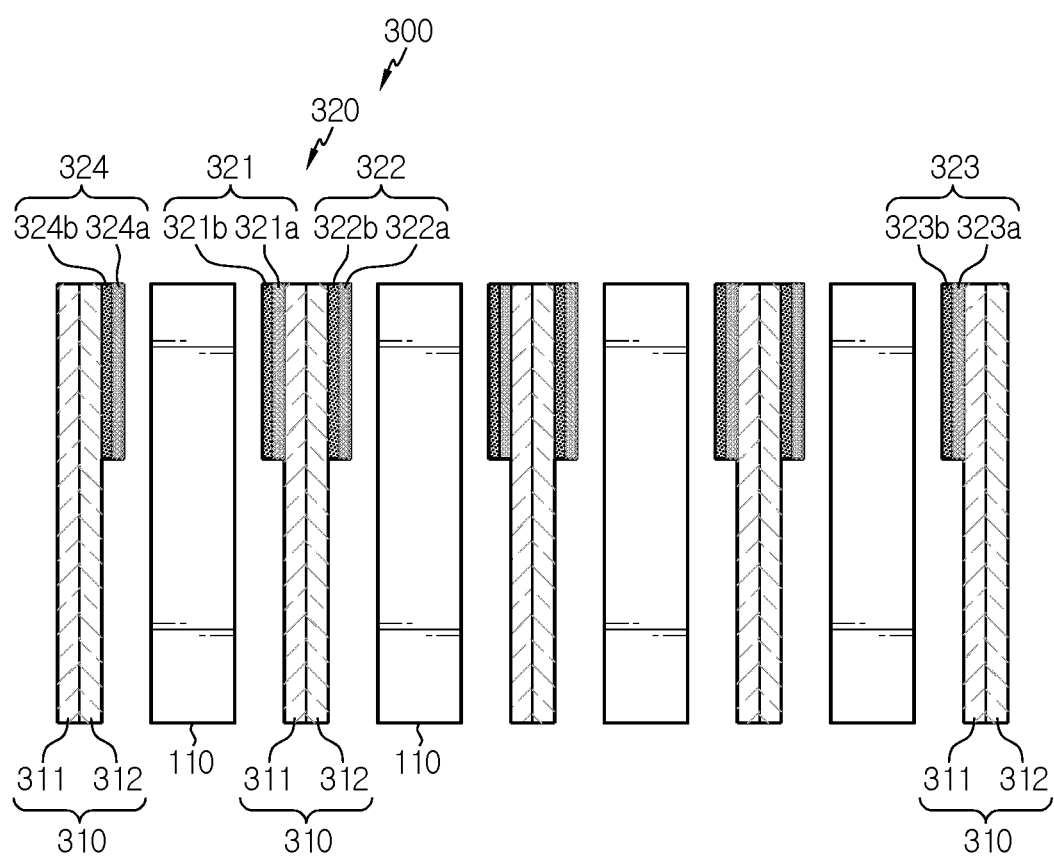
FIG. 2 is a sectional view schematically showing that a thermoelectric element is spaced apart from a battery cell, in the battery module according to the first embodiment of the present disclosure.
Figure 3:
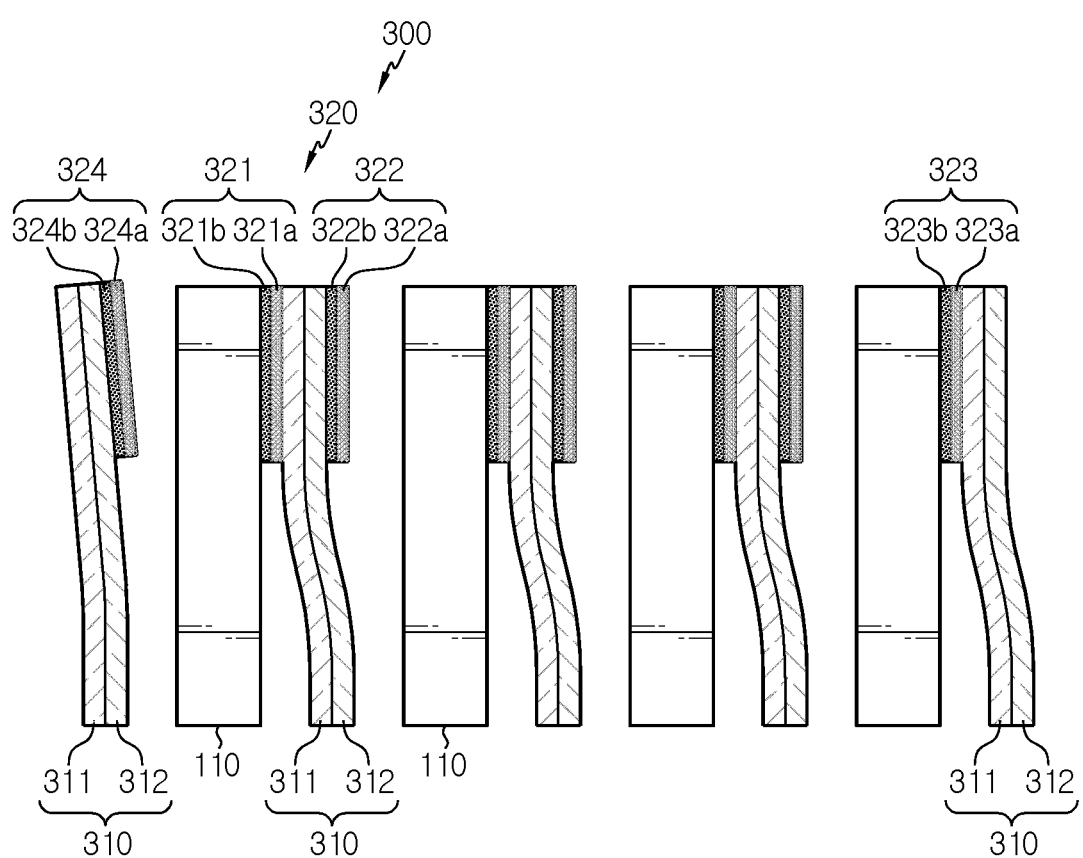
FIG. 3 is a sectional view schematically showing that a heat absorbing portion of a first thermoelectric element is in contact with the battery cell, in the battery module according to the first embodiment of the present disclosure.
Figure 4:
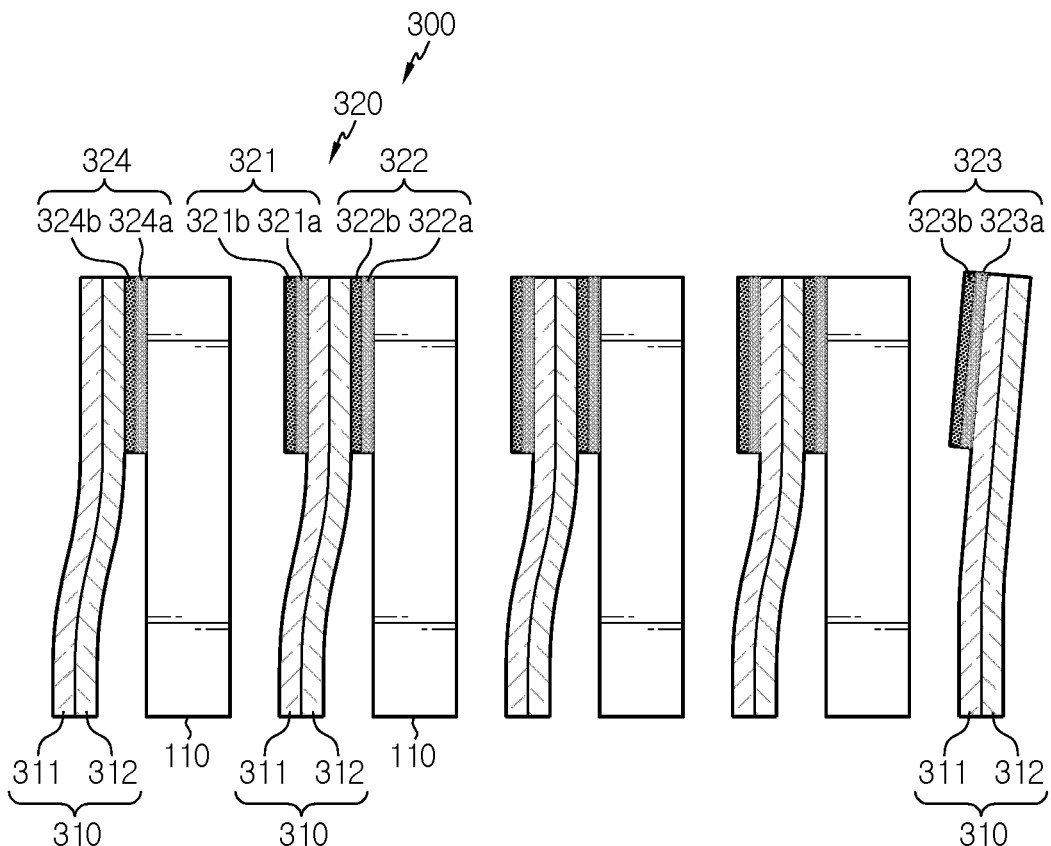
FIG. 4 is a sectional view schematically showing that a heat emitting portion of a second thermoelectric element is in contact with the battery cell, in the battery module according to the first embodiment of the present disclosure.
Figure 5:
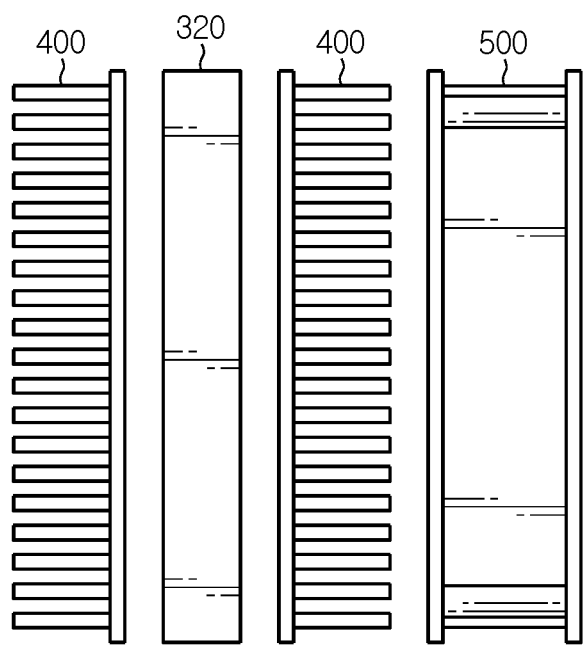
FIG. 5 is a sectional view schematically showing that a heat dissipation plate and a heat dissipation fan coupled to the thermoelectric element are separated, in the battery module according to the first embodiment of the present disclosure.

FIG. 1 is a perspective view schematically showing a battery module according to the first embodiment of the present disclosure, FIG. 2 is a sectional view schematically showing that a thermoelectric element is spaced apart from a battery cell, in the battery module according to the first embodiment of the present disclosure, FIG. 3 is a sectional view schematically showing that a heat absorbing portion of a first thermoelectric element is in contact with the battery cell, in the battery module according to the first embodiment of the present disclosure, FIG. 4 is a sectional view schematically showing that a heat emitting portion of a second thermoelectric element is in contact with the battery cell, in the battery module according to the first embodiment of the present disclosure, and FIG. 5 is a sectional view schematically showing that a heat dissipation plate and a heat dissipation fan coupled to the thermoelectric element are separated, in the battery module according to the first embodiment of the present disclosure.

Referring to FIGS. 1 to 5, a battery module 10 according to the first embodiment of the present disclosure includes a battery cell stack 100, a casing 200, and a heat transfer member 300.

The battery cell stack 100 is provided so that a plurality of battery cells 110 are stacked. Here, the battery cell 110 may have various structures, and the plurality of battery cells 110 may be stacked in various ways. In addition, a plurality of battery cells 110 provided with electrode leads are included in the battery cell stack 100. The electrode lead provided to the battery cell 110 is a kind of terminal exposed to the outside and connected to an external device and may be made of a conductive material. The electrode lead may include a positive electrode lead and a negative electrode lead. The positive electrode lead and the negative electrode lead may be disposed at opposite sides of the battery cell 110 in the longitudinal direction, or the positive electrode lead and the negative electrode lead may be disposed at the same side of the battery cell 110 in the longitudinal direction. The electrode lead may be electrically coupled to a bus bar. The battery cell 110 may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell stack 100 may include a plurality of cartridges (not shown) for respectively accommodating the battery cells 110. Each cartridge (not shown) may be manufactured by injection-molding plastic, and a plurality of cartridges (not shown), each having an accommodation portion capable of storing the battery cell 110, may be stacked. A cartridge assembly in which the plurality of cartridges (not shown) are stacked may have a connector element or a terminal element. The connector element may include, for example, various types of electrical connection parts or members for connection to a battery management system (BMS) that may provide data on voltage or temperature of the battery cell 110. In addition, the terminal element includes a positive terminal and a negative terminal as main terminals connected to the battery cell 110, and the terminal element may have a terminal bolt to be electrically connected to the outside. Meanwhile, the battery cell 110 may have various shapes.

In the casing 200, the battery cell stack 100 or the cartridge assembly accommodating the battery cell stack 100 may be stored. That is, the casing 200 surrounds the battery cell stack 100 or the plurality of cartridge assemblies entirely, thereby protecting the battery cell stack 100 or the cartridge assemblies from external vibration or impact.

The casing 200 may be shaped corresponding to the shape of the battery cell stack 100 or the cartridge assembly. For example, if the battery cell stack 100 or the cartridge assembly is provided in a hexahedral shape, the casing 200 may also be provided in a hexahedral shape to correspond thereto. The casing 200 may be manufactured by, for example, bending a metal plate, or using an injection-molded plastic. In addition, the casing 200 may be manufactured as an integral type, or may be manufactured as a separable type. The casing 200 may have a perforated portion (not shown) formed therein so that the connector element or the terminal element may be exposed therethrough to the outside. That is, the connector element or the terminal element may be electrically connected to a predetermined external component or member, and the perforated portion may be formed in the casing 200 so that the electrical connection is not disturbed by the casing 200.

The heat transfer member 300 is disposed between any one battery cell 110 of the battery cell stack 100 and another battery cell 110 adjacent to the any one battery cell 110 to cool or heat the battery cell 110. Here, the heat transfer member 300 is installed to be spaced from the battery cell 110, and if the temperature of the battery cell 110 rises or falls, the heat transfer member 300 comes into contact with the battery cell 110 to cool or heat the battery cell 110.

The heat transfer member 300 may include a bimetal 310 and a thermoelectric element 320. Hereinafter, the bimetal 310 and the thermoelectric element 320 will be described. Meanwhile, though being exaggerated in the drawings for convenience of description, the bimetal 310 and the thermoelectric element 320 may have a sufficiently small size, and also, the gap between any one battery cell 110 and another battery cell 110 adjacent to the any one battery cell 110 may also be formed as small as necessary.

The bimetal 310 is manufactured so that a plurality of metals having different thermal expansion coefficients are coupled to each other, and the bimetal 310 is bent if heat is provided to the bimetal 310 or heat is released from the bimetal 310. For example, as shown in FIGS. 2 to 4, if heat is provided to the bimetal 310 in which a first metal 311 and a second metal 312 having different thermal expansion coefficients are coupled to each other, as shown in FIG. 3, the bimetal 310 is bent to the left based on FIG. 3. In addition, if heat is released from the bimetal 310 in which the first metal 311 and the second metal 312 having different thermal expansion coefficients are coupled to each other, as shown in FIG. 4, the bimetal 310 is bent to the right based on FIG. 4. Here, the bimetal 310 may be provided to be bent toward the battery cell 110 by convection of heat generated from the battery cell 110. In addition, the bimetal 310 may be provided to be bent toward the battery cell 110 due to an external low temperature, such as cold weather. For example, if heat generated from the battery cell 110 due to the continuous use of the battery cell 110 moves to the bimetal 310 by convection, the bimetal 310 may be bent in any one direction due to the heat generated from the battery cell 110 and moved to the bimetal 310. In addition, if the weather is cold or an external temperature is low such as in the polar region, the bimetal 310 may be bent in a direction opposite to the direction in which the bimetal 310 is bent due to the heat generated from the battery cell 110.

The thermoelectric element 320 may be provided in various ways. For example, the thermoelectric element 320 may be a Peltier element that may give a Peltier effect for absorbing heat at one side and emitting heat at the other side according to a current direction if ends of two types of metals are connected and a current is applied thereto. Here, referring to FIG. 5, at least one of a heat dissipation plate 400 and a heat dissipation fan 500 may be coupled to the thermoelectric element 320. Hereinafter, the thermoelectric element 320 will be described as a Peltier element. The thermoelectric element 320 may be coupled to at least one of both ends of the bimetal 310. Referring to FIG. 2, if the thermoelectric elements 320 are coupled to both ends of the bimetal 310, a first thermoelectric elements 321 and a second thermoelectric elements 322 may be coupled to both ends of the bimetal 310, respectively. Here, the first thermoelectric element 321 may be coupled to one end of the bimetal 310, for example to a left side of the bimetal 310 based on FIG. 2, and the second thermoelectric element 322 may be coupled to the other end of the bimetal 310, which is opposite to one end, for example to a right side of the bimetal 310 based on FIG. 2. Referring to FIG. 2, the first thermoelectric element 321 includes a heat emitting portion 321*a* and a heat absorbing portion 321*b*, may be disposed such that the heat emitting portion 321*a* of the first thermoelectric element 321 is coupled to the bimetal 310 and the heat absorbing portion 321b of the first thermoelectric element 321 is spaced from the battery cell 110 and disposed to face the battery cell 110. In addition, when the temperature of the battery cell 110 rises as shown in FIG. 3, if the bimetal 310 is bent to the left based on FIG. 3 due to the heat generated from the battery cell 110, the first thermoelectric element 321 coupled to the bimetal 310 may move toward the battery cell 110 and the heat absorbing portion 321b of the first thermoelectric element 321 may come into contact with the battery cell 110. According to this, the heat absorbing portion 321b of the first thermoelectric element 321 is brought into contact with the battery cell 110 having a rising temperature to release the heat of the battery cell 110, thereby cooling the battery cell 110. In addition, referring to FIG. 2, the second thermoelectric element 322 also includes a heat emitting portion 322a and a heat absorbing portion 322b, may be disposed such that the heat absorbing portion 322b of the second thermoelectric element 322 is coupled to the bimetal 310 and the heat emitting portion 322a of the second thermoelectric element 322 is spaced apart from the battery cell 110 to face the battery cell 110. In addition, when the temperature of the battery cell 110 falls as shown in FIG. 4, if the bimetal 310 is bent to the right based on FIG. 4, the second thermoelectric element 322 coupled to the bimetal 310 may move toward the battery cell 110 and the heat emitting portion 322a of the second thermoelectric element 322 may come into contact with the battery cell 110. According to this, the heat emitting portion 322a of the second thermoelectric element 322 is brought into contact with the battery cell 110 having a fallen temperature to transfer heat to the battery cell 110, thereby heating the battery cell 110. As described above, if the first thermoelectric element 321 and the second thermoelectric element 322 are coupled to both ends of the bimetal 310 and heat is generated in the battery cell 110, the first thermoelectric element 321 cools the battery cell 110. Also, if the battery module 10 is use in cold weather or the like, the second thermoelectric element 322 transfers heat to the battery cell 110 to heat the battery cell 110. Thus, the battery module 10 may be used within a preset optimal temperature range, thereby preventing the shortening of the life span of the battery module 10. Meanwhile, as shown in FIG. 2, for example, the thermoelectric element 320 may be coupled to only one of both ends of the bimetal 310, if the bimetal 310 is located at any one of both ends. Here, based on FIG. 2, a bimetal 310 to which a third thermoelectric element 323 is coupled may be located at a right end, and a bimetal 310 to which a fourth thermoelectric element 324 is coupled may be located at a left end. The third thermoelectric element 323 and the fourth thermoelectric element 324 are Peltier elements, and the third thermoelectric element 323 may include a heat emitting portion 323a and a heat absorbing portion 323b, like the first thermoelectric element 321. In addition, the heat emitting portion 323a of the third thermoelectric element 323 may be coupled to the bimetal 310, and the heat absorbing portion 323b of the third thermoelectric element 323 may be spaced apart from the battery cell 110 and disposed to face the battery cell 110. Here, when the temperature of the battery cell 110 rises, the heat absorbing portion 323b of the third thermoelectric element 323 may come into contact with the battery cell 110. In addition, the fourth thermoelectric element 324 may be disposed such that the heat absorbing portion 324b of the fourth thermoelectric element 324 is coupled to the bimetal 310 and the heat emitting portion 324a of the fourth thermoelectric element 324 is spaced from the battery cell 110 to face the battery cell 110, like the second thermoelectric element 322. Here, when the temperature of the battery cell 110 falls, the heat emitting portion 324a of the fourth thermoelectric element 324 may come into contact with the battery cell 110. Since the operations of the third thermoelectric element 323 and the fourth thermoelectric element 324 are basically common to the first thermoelectric element 321 and the second thermoelectric element 322, respectively, the detailed description is replaced by the foregoing description of the first thermoelectric element 321 and the second thermoelectric element 322. Meanwhile, it is obvious that both the first thermoelectric element 321 and the second thermoelectric element 322 may be provided to the bimetals 310 located at both ends.

Hereinafter, the operation and effect of the battery module 10 according to the first embodiment of the present disclosure will be described with reference to the drawings.

Referring to FIG. 2, the first thermoelectric element 321 is coupled to the left side of the bimetal 310 and the second thermoelectric element 322 is coupled to the right side of the bimetal 310 based on FIG. 2. Here, in the first thermoelectric element 321, the heat emitting portion 321a is coupled to the bimetal 310, and the heat absorbing portion 321b is spaced away from the battery cell 110. In addition, in the second thermoelectric element 322, the heat absorbing portion 322b is coupled to the bimetal 310, and the heat emitting portion 322a is spaced spaced apart from the battery cell 110. If heat is generated from the battery cell 110, the heat generated from the battery cell 110 is transferred to the bimetal 310 by convection so that the bimetal 310 is bent as shown in FIG. 3, and the heat absorbing portion 321b of the first thermoelectric element 321 coupled to the bimetal 310 comes into contact with the battery cell 110 to cool the battery cell 110. In addition, if the temperature of the battery cell 110 falls in cold weather or the like, the bimetal 310 is bent as shown in FIG. 4, and the heat emitting portion 322a of the second thermoelectric element 322 coupled to the bimetal 310 comes into contact with the battery cell 110 to heat the battery cell 110. In addition, as shown in FIG. 2, since the heat transfer member 300 is disposed between the plurality of battery cells 110, respectively, all battery cells 110 may be cooled or heated, thereby allowing both cooling and heating of the battery cells 110.

Meanwhile, in FIG. 2, the first thermoelectric element 321 is coupled to the left side of the bimetal 310, and the second thermoelectric element 322 is coupled to the right side of the bimetal 310. However, it is also possible that the first thermoelectric element 321 is coupled to the right side of the bimetal 310 and the second thermoelectric element 322 is coupled to the left side of the bimetal 310.

Figure 6:
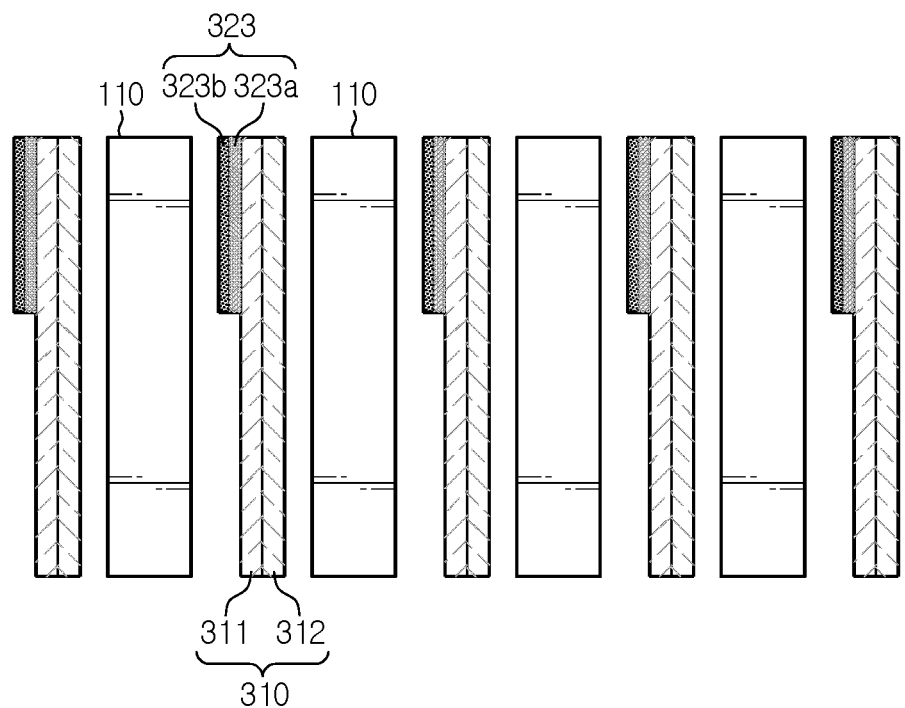
FIG. 6 is a sectional view schematically showing that a third thermoelectric element is spaced apart from the battery cell, in a battery module according to the second embodiment of the present disclosure.
Figure 7:
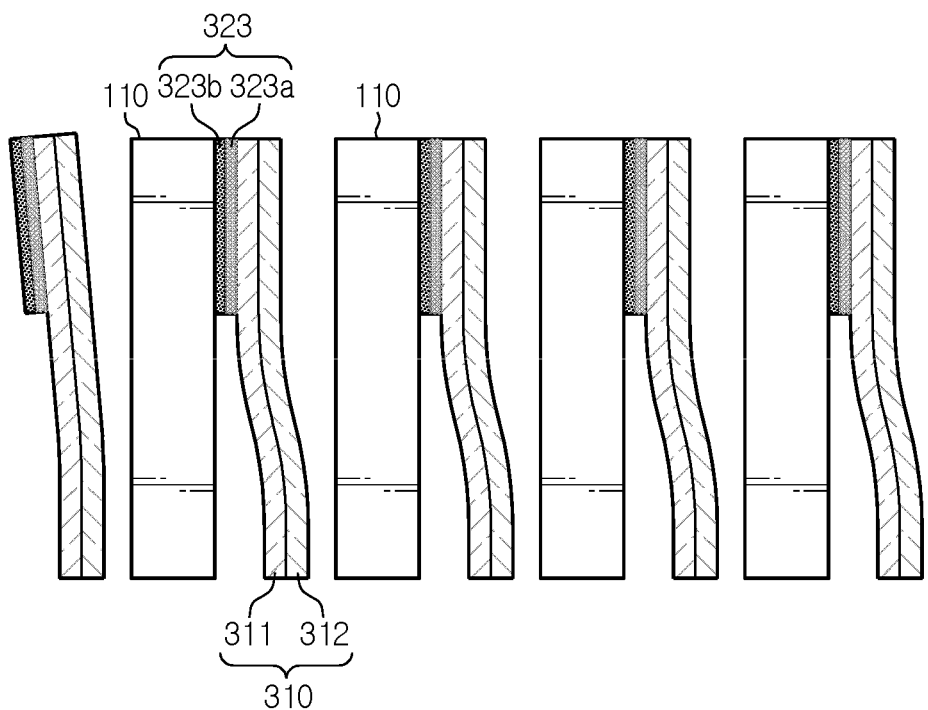
FIG. 7 is a sectional view schematically showing that a heat absorbing portion of the third thermoelectric element is in contact with the battery cell, in the battery module according to the second embodiment of the present disclosure.
Figure 8:
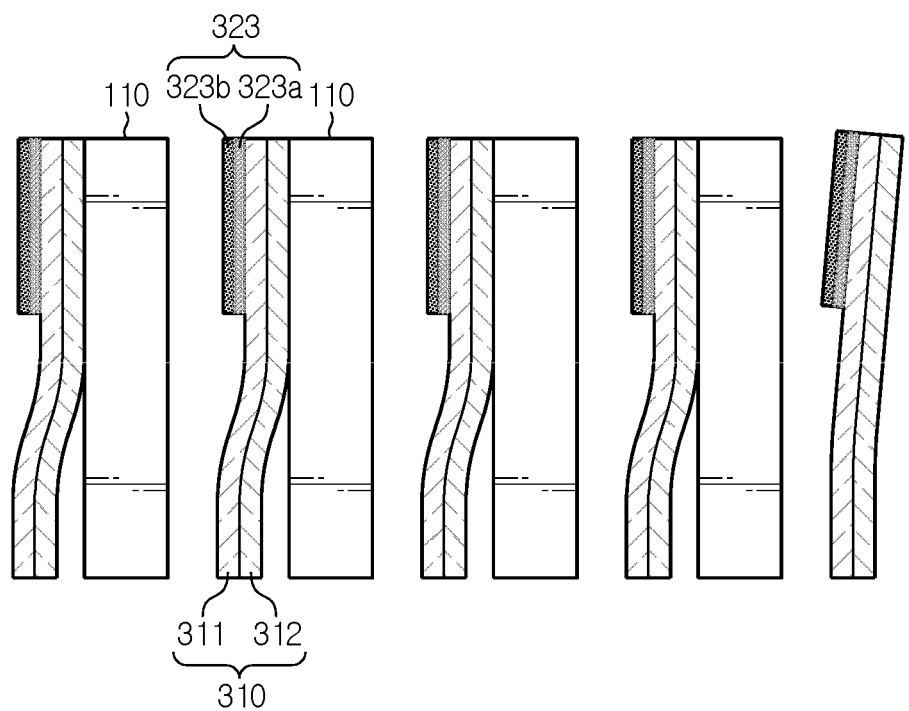
FIG. 8 is a sectional view schematically showing that a bimetal is in contact with the battery cell, in the battery module according to the second embodiment of the present disclosure.

FIG. 6 is a sectional view schematically showing that a third thermoelectric element is spaced apart from the battery cell, in a battery module according to the second embodiment of the present disclosure, FIG. 7 is a sectional view schematically showing that a heat absorbing portion of the third thermoelectric element is in contact with the battery cell, in the battery module according to the second embodiment of the present disclosure, and FIG. 8 is a sectional view schematically showing that a bimetal is in contact with the battery cell, in the battery module according to the second embodiment of the present disclosure.

Hereinafter, the operations and effects of the battery module 10 according to the second embodiment of the present disclosure will be described with reference to the accompanying drawings. Here, a feature already explained in relation to the battery module 10 according to the first disclosure of the present disclosure will not be described in detail again.

In the second embodiment of the present disclosure, the third thermoelectric element 323 comes into contact with the battery cell 110 if the temperature of the battery cell 110 rises. However, if the temperature of the battery cell 110 falls, the bimetal 310 comes into contact with the battery cell 110, different from the first embodiment.

Referring to FIG. 6, a plurality of bimetals 310 coupled only to the third thermoelectric element 323 are provided to be disposed between the battery cells 110, respectively. That is, in the first embodiment, the bimetal 310 to which both the first thermoelectric element 321 and the second thermoelectric element 322 are coupled is disposed between the battery cells 110, and the bimetals 310 are located at both side ends. For example, based on FIG. 2, the third thermoelectric element 323 is located at the right end, and the fourth thermoelectric element 324 is located at the left end. However, in the second embodiment, only the third thermoelectric element 323 is coupled to all bimetals 310. Here, as shown in FIG. 7, if heat is generated in the battery cell 110 and the bimetal 310 is bent toward the battery cell 110 at the left side based on FIG. 7, the heat absorbing portion 323b of the third thermoelectric element 323 comes into contact with the battery cell 110 to cool the battery cell 110. The operation of the third thermoelectric element 323 is the same as described in the first embodiment and thus will not be described again. In addition, when the temperature of the battery cell 110 falls in cold weather or the like, as shown in FIG. 8, if the bimetal 310 is bent toward the battery cell 110 at the right side based on FIG. 8, the bimetal 310 comes into contact with the battery cell 110, and the heat generated from the heat emitting portion 323a of the third thermoelectric element 323 is transferred to the battery cell 110 through the bimetal 310. That is, the heat generated from the heat emitting portion 323a of the third thermoelectric element 323 is transferred to the battery cell 110 via the bimetal 310, thereby heating the battery cell 110. In the second embodiment, the heating effect may be inferior in cold weather in comparison with the first embodiment. However, since the thickness may be made thinner than the first embodiment, the first embodiment and the second embodiment may be appropriately selected and used as needed.

Figure 9:
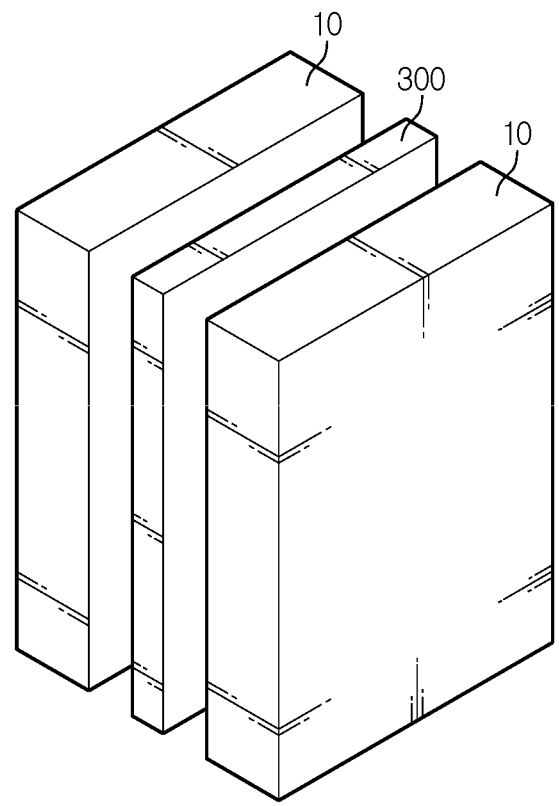
FIG. 9 is a perspective view schematically showing that a heat transfer member is spaced apart from the battery module, in a battery pack according to an embodiment of the present disclosure.

FIG. 9 is a perspective view schematically showing that a heat transfer member is spaced apart from the battery module, in a battery pack according to an embodiment of the present disclosure.

Hereinafter, the operations and effects of a battery pack according to an embodiment of the present disclosure will be described with reference to the accompanying drawings. Here, a feature already explained in relation to the battery module 10 according to the first and second embodiments of the present disclosure will not be described in detail again.

In the battery pack according to an embodiment of the present disclosure, the heat transfer member 300 is disposed between the battery modules 10, different from the first embodiment and the second embodiment in which the heat transfer member 300 is disposed between the battery cells 110.

Referring to FIG. 9, the heat transfer member 300 is disposed between the battery modules 10, and the heat transfer member 300 cools or heats the battery modules 10. Here, the specific operation and effect of the heat transfer member 300 is common to the first and second embodiments described above, and thus its explanation is replaced by the above description.

Meanwhile, a battery pack (not shown) according to another embodiment of the present disclosure may include at least one battery module 10 as described above, for example at least one battery module 10 having the heat transfer member 300 disposed between the battery cells 110. That is, the battery module 10 includes a battery cell stack 100 in which a plurality of battery cells 110 are stacked, and the heat transfer member 300 is disposed between the battery cells 110, identical to the former embodiment. Also, in addition to the battery modules 10, the battery pack (not shown) may further includes a case for accommodating the battery modules 10, and various devices for controlling charge and discharge of the battery modules 10, such as a BMS, a current sensor, a fuse, and the like.

Meanwhile, a vehicle (not shown) according to an embodiment of the present disclosure may include the battery module 10 or the battery pack (not shown) described above, and the battery pack (not shown) may include the battery module 10. In addition, the battery module 10 according to an embodiment of the present disclosure may be applied to the vehicle (not shown), for example a predetermined vehicle (not shown) provided to use electricity such as an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module, and a battery pack and a vehicle including the battery module, and may be used in industries related to secondary batteries.

What is claimed is:

1. A battery module, comprising:
   a battery cell stack in which a plurality of battery cells are stacked;
   a casing configured to surround the battery cell stack; and
   a heat transfer member to cool or heat the battery cells, the heat transfer member being disposed between a first battery cell and a second battery cell of the plurality of battery cells in the battery cell stack, the second battery cell being adjacent to the first battery cell,
   wherein the heat transfer member is spaced apart from the first and second battery cells and includes a thermoelectric element, the heat transfer member being configured to selectively move into and out of contact with at least one of the first and second battery cells so as to emit or absorb heat between the heat transfer member and the at least one of the first and second battery cells.

2. The battery module according to claim 1,
   wherein the heat transfer member includes:
   a bimetal in which a plurality of metals having different thermal expansion coefficients are coupled to each other; and
   the thermoelectric element coupled to a first end of the bimetal.

3. The battery module according to claim 2,
   wherein at least one of a heat dissipation plate and a heat dissipation fan is coupled to the thermoelectric element.

4. The battery module according to claim 2,
   wherein the bimetal is configured to be bent toward the at least one of the first and second battery cells by convection of heat generated from the first and second battery cells.

5. The battery module according to claim 4,
wherein the thermoelectric element is a Peltier element, and
a second thermoelectric element is coupled to a second end of the bimetal, the second thermoelectric element being a Peltier element, and the second end being opposite to the first end.

6. The battery module according to claim 5,
wherein the first thermoelectric element includes a heat emitting portion and a heat absorbing portion,
the heat emitting portion of the first thermoelectric element being coupled to the bimetal, and the heat absorbing portion of the first thermoelectric element being spaced apart from the at least one of the first and second battery cells, the heat absorbing portion of the first thermoelectric element being configured to contact the at least one of the first and second battery cells when the temperature of the at least one of the first and second battery cells rises, and
the second thermoelectric element includes a heat emitting portion and a heat absorbing portion,
the heat absorbing portion of the second thermoelectric element being coupled to the bimetal, and the heat emitting portion of the second thermoelectric element being spaced apart from the at least one of the first and second battery cells, the heat emitting portion of the second thermoelectric element being configured to contact the at least one of the first and second battery cells when the temperature of the at least one of the first and second battery cells falls.

7. The battery module according to claim 4,
wherein no thermoelectric element is coupled to a second end of the bimetal, the second end being opposite to the first end, and wherein the thermoelectric element is a Peltier element.

8. The battery module according to claim 7,
wherein the thermoelectric element includes a heat emitting portion and a heat absorbing portion,
the heat emitting portion of the thermoelectric element being coupled to the bimetal, and the heat absorbing portion of the thermoelectric element being spaced apart from at least one of the first and second the battery cells, the heat absorbing portion being configured to contact the at least one of the first and second battery cells when the temperature of the at least one of the first and second battery cells rises.

9. The battery module according to claim 7,
wherein the thermoelectric element includes a heat emitting portion and a heat absorbing portion,
the heat absorbing portion of the thermoelectric element being coupled to the bimetal, and the heat emitting portion of the thermoelectric element being spaced apart from the at least one of the first and second battery cells, the heat emitting portion being configured to contact the at least one of the first and second battery cells when the temperature of the at least one of the first and second battery cells falls.

10. The battery module according to claim 8,
wherein the heat transfer member includes a plurality of the heat transfer members, each of the heat transfer members being disposed between a respective pair of the plurality of battery cells, and
wherein the heat absorbing portion of each of the thermoelectric elements contacts a respective one of the plurality of battery cells when the temperature of the battery cells rises, and the bimetal of each of the thermoelectric elements contacts a respective one of the plurality of battery cells when the temperature of the battery cells falls, so that heat generated from the heat emitting portion of each of the thermoelectric elements is transferred to the respective one of the battery cells through the bimetal.

11. A battery pack, comprising:
a plurality of battery modules, each one of the battery modules including a battery cell stack in which a plurality of battery cells are stacked, and a casing configured to surround the battery cell stack; and
a heat transfer member to cool or heat the battery modules, the heat transfer member being disposed between a first battery module and a second battery module of the plurality of the battery modules, the second battery module being adjacent to the first battery module,
wherein the heat transfer member is spaced apart from the first and second battery modules and includes a thermoelectric element, the heat transfer member being configured to selectively move into and out of contact with at least one of the first and second battery modules so as to emit or absorb heat between the heat transfer member and the at least one of the first and second battery modules.

12. A battery pack, comprising the battery module according to claim 1.

13. A vehicle, comprising the battery module according to claim 1.

* * * * *